US006971297B1

(12) United States Patent
Meredith et al.

(10) Patent No.: US 6,971,297 B1
(45) **Date of Patent: *Dec. 6, 2005**

(54) GUARD AND CONTROL APPARATUSES FOR SLIDING COMPOUND MITER SAW

(75) Inventors: Daryl S. Meredith, Hampstead, MD (US); Scott Price, Pylesville, MD (US); William R. Stumpf, Kingsville, MD (US)

(73) Assignee: Black & Decker Inc., Newark, DE (US)

( * ) Notice: Subject to any disclaimer, the term of this patent is extended or adjusted under 35 U.S.C. 154(b) by 146 days.

This patent is subject to a terminal disclaimer.

(21) Appl. No.: 09/698,920

(22) Filed: Oct. 27, 2000

Related U.S. Application Data

(62) Division of application No. 08/974,093, filed on Nov. 19, 1997, now Pat. No. 6,182,548, which is a division of application No. 08/541,667, filed on Oct. 10, 1995, now Pat. No. 5,724,875.

(51) Int. Cl.$^7$ ............................................ B23D 45/04
(52) U.S. Cl. ............................ 83/478; 83/490; 83/827
(58) Field of Search ....................... 83/478, 490, 471.3, 83/473, 829, 827; 30/390, 391

(56) References Cited

U.S. PATENT DOCUMENTS

| | | | | |
|---|---|---|---|---|
| 679,167 A | | 7/1901 | Garding | |
| 852,964 A | | 5/1907 | Koegel | |
| 1,314,291 A | | 8/1919 | Wallace | |
| 1,464,924 A | | 8/1923 | Drummond | |
| 1,589,970 A | | 6/1926 | Jones | |
| 1,646,589 A | | 10/1927 | Meek et al. | |
| 2,106,321 A | | 1/1938 | Guertin | |
| 2,765,824 A | * | 10/1956 | Hartmann et al. | 30/391 |
| 2,861,607 A | * | 11/1958 | Emmons | 30/391 |
| 3,721,141 A | | 3/1973 | Frostad | |
| 3,821,918 A | | 7/1974 | Niehaus et al. | |
| 3,998,121 A | | 12/1976 | Bennett | |
| 4,028,975 A | | 6/1977 | Bennett | |
| 4,176,571 A | | 12/1979 | Batson | |
| 4,318,324 A | | 3/1982 | Hall et al. | |
| 4,343,213 A | | 8/1982 | Drixler | |
| 4,581,966 A | | 4/1986 | Kaiser et al. | |
| 4,774,866 A | | 10/1988 | Dehari et al. | |
| 4,799,416 A | | 1/1989 | Kumasaka et al. | |

(Continued)

FOREIGN PATENT DOCUMENTS

EP 0 538 066 A 4/1993

(Continued)

OTHER PUBLICATIONS

European Search Report dated Jul. 1, 2004.

(Continued)

*Primary Examiner*—Kenneth E. Peterson
(74) *Attorney, Agent, or Firm*—Harness, Dickey & Pierce P.L.C.

(57) ABSTRACT

A guard assembly for a saw or other cutting device includes fixed and movable guards relatively pivotal by way of a linkage assembly having two links pivotally interconnected coaxially with a cam roller engageable with a cam surface for controlling relative guard movement. Other preferred features include a torsional coil guard return spring and spring enclosure that minimizes interference with workpiece cutting depth, an arbor shaft cover retention fastener that doubles, along with another caliper member, as a blade caliper set that prevents guard damage in the event of a bent or deflected blade or cutter, a drive assembly hold-down assembly for storage, and a horizontally-extending handle centered horizontally relative to the blade or cutter.

15 Claims, 14 Drawing Sheets

U.S. PATENT DOCUMENTS

| | | | | |
|---|---|---|---|---|
| 4,805,504 A | | 2/1989 | Fushiya et al. | |
| 4,869,142 A | | 9/1989 | Sato et al. | |
| 4,892,022 A | | 1/1990 | Cotton et al. | |
| 4,934,233 A | | 6/1990 | Brundage et al. | |
| 4,951,540 A | | 8/1990 | Cross et al. | |
| 5,020,406 A | | 6/1991 | Sasaki et al. | |
| 5,046,390 A | | 9/1991 | Sasaki | |
| 5,054,352 A | | 10/1991 | Fushiya et al. | |
| 5,060,548 A | | 10/1991 | Sato et al. | |
| 5,074,179 A | | 12/1991 | Omi | |
| 5,146,825 A | | 9/1992 | Dehari | |
| 5,203,245 A | | 4/1993 | Terpstra | |
| D346,173 S | | 4/1994 | Price | |
| 5,347,902 A | * | 9/1994 | Brickner et al. | 83/468.3 |
| 5,370,025 A | | 12/1994 | Itzov | |
| 5,524,516 A | | 6/1996 | Sasaki et al. | |
| 5,579,584 A | | 12/1996 | Hoffman | |
| 5,609,085 A | | 3/1997 | Chang | |
| 5,623,860 A | | 4/1997 | Schoene et al. | |
| 5,638,731 A | | 6/1997 | Garuglieri | |
| 5,724,875 A | * | 3/1998 | Meredith et al. | |
| 5,755,148 A | * | 5/1998 | Stumpf et al. | 83/468.2 |
| 5,937,720 A | * | 8/1999 | Itzov | 83/397 |
| 5,957,021 A | * | 9/1999 | Meredith et al. | |
| 6,182,548 B1 | * | 2/2001 | Meredith et al. | |
| 6,425,309 B1 | * | 7/2002 | Stumpf et al. | 83/468.2 |
| 6,431,042 B1 | * | 8/2002 | Brault et al. | 83/471.3 |

FOREIGN PATENT DOCUMENTS

| | | | |
|---|---|---|---|
| EP | 0 538 066 | A1 | 4/1993 |
| EP | 0 570 904 | A | 11/1993 |
| EP | 0 633 106 | A1 | 1/1995 |
| EP | 0 633 106 | A | 11/1995 |
| GB | 1777384 | | 7/1976 |
| GB | 2 304 075 | A | 3/1997 |
| JP | 6-59008 | | 8/1994 |
| SU | 484 996 | A | 9/1975 |
| WO | WO 93/13919 | A | 7/1993 |

OTHER PUBLICATIONS

European Search Report dated Jul. 13, 2004.

* cited by examiner

GUARD AND CONTROL APPARATUSES FOR SLIDING COMPOUND MITER SAW

This is a division of U.S. patent application Ser. No. 08/974,093, filed Nov. 19, 1997 now U.S. Pat. No. 6,182, 548, which is a divisional of application Ser. No. 08/541, 667, filed Oct. 10, 1995, now U.S. Pat. No. 5,724,875, issued Mar. 10, 1998.

This patent application is related to a copending U.S. patent application Ser. No. 08/499,339, filed Jul. 7, 1995, entitled "Adjustable Fence For Compound Miter Saw", the disclosure of which is hereby incorporated by reference herein.

The present invention relates primarily to power chop-type saws, miter saws, compound miter saws or other power operated equipment or machinery utilizing a blade or other cutter for performing working operations on workpieces composed of wood, metal, plastic or other materials. More particularly, the present invention seeks to achieve various improvements in blade guard mechanisms for such power operated equipment, typically having a lower movable guard pivotally movable relative to a fixed upper guard between "closed" and "open" positions as the blade is pivotally moved between non-cutting and cutting positions. Preferred forms of the present invention also relate to improvements in blade or cutter arbor shaft covers and to blade or cutter calipers in conjunction with the guard mechanism, as well as to a blade or cutter hold-down arrangement for preventing operation of the saw when in a locked-down state. Still another preferred form of the invention includes advantageous improvements in the operator handle position, orientation and configurations that optimize the user's comfort and control of the blade or cutter when performing a wide variety of cutting operations.

BACKGROUND AND SUMMARY OF THE INVENTION

Saws and other apparatuses designed for cutting or performing other working operations on a workpiece typically include mechanisms for setting the saw blade or cutting tool in selected angular relationships with the workpiece when performing various cutting operations. Examples include chop-type compound miter saws adapted for allowing the user to selectively set the saw blade at any of a number of positions or modes for square cutting, miter cutting, bevel cutting, or even compound miter cutting in which combination miter angle and bevel angle cutting operations are performed on the workpiece. In addition, some operations, such as dado cutting, groove cutting, or shaping operations, for example, require the use of saw blades or other cutting or working devices of different shapes or sizes to be substituted for one another in order to perform the desired operation on the workpiece. In these instances, the saw or cutting device must be capable of cross-cutting or sliding movement of the blade or cutting tool in lieu of, or in addition to, chop-type engagement with the workpiece.

In order to allow for the setting of miter and bevel angles, the saw blade, cutter or other working device is angularly adjustable with respect to both a horizontal base and a vertical fence against which the workpiece is positioned. The miter adjustment allows the saw blade, cutter or other working device to be angularly positioned with respect to the vertical fence while maintaining perpendicularity with the horizontal base. The bevel adjustment allows the saw blade, cutter or other working device to be angularly positioned with respect to the horizontal base while maintaining perpendicularity with the vertical fence. Various combinations of miter angles and bevel angles are accomplished by simultaneously adjusting the angularity of the blade with respect to both the horizontal base and the vertical fence.

In any of these cutting operations whether they are performed on chop-type, cross-cut, or combination type devices, a blade guard mechanism must be capable of exposing a sufficient portion of the blade to perform the desired cutting operation, while at the same time adequately protecting the operator during cutting and when the blade is in an at-rest position. Such a guard mechanism also should preferably protect the guard from damage in the event of a bent or deflected blade or cutter during such operations, should prevent the blade or cutter from vibrating loose from or on its arbor shaft during such operations, and should allow for maximum user comfort and control when performing such operations. Preferably, undesired operation of the saw or other such device should be prevented when in a storage or inoperative state.

Unfortunately, many conventional devices have proved to be deficient in meeting some or all of these objectives, or have required burdensome multiplicities of parts or components in order to achieve them. Thus, many of such conventional devices have also often been found to be heavy and overly complex, difficult and expensive to design, manufacture and maintain, as well as requiring large spaces in which to operate them. In some cases, meeting these objectives has also resulted in unduly limiting cutting capacities.

In accordance with the present invention, a blade or cutter guard mechanism preferably includes an upper guard that is fixed relative to a drive assembly for the arbor shaft of the blade or cutter and a lower guard that is pivotally movable relative to the fixed upper guard. Preferably, a guard-actuating linkage assembly includes a first link having an inner end pivotally interconnected with a housing assembly upon which the drive assembly is pivotally mounted in order to move the blade and drive assembly into engagement with the workpiece. An opposite intermediate end of the first link is pivotally interconnected with an intermediate end of yet another, second link whose opposite outer end is pivotally and drivingly interconnected with the movable guard. An intermediate roller or roller assembly is rotatably interconnected with the interconnected intermediate ends of the links and is engageable with a cam surface at a fixed location formed on the drive assembly and thus fixed relative to the fixed guard. The shape and position of the cam surfaces are pre-designed to control the rate of movement of movable guard as the saw blade or cutter is moved between non-cutting and cutting positions. In a preferred form of this guard arrangement, the moveable guard can be manually moved for overriding pivotal movement irrespectively and independently of the position of the blade and drive assembly relative to the workpiece.

A return spring can be advantageously included in the guard linkage assembly for resiliently biasing the movable guard toward a normally closed position covering a maximum portion of the cutting periphery of the blade or cutter. Such return spring is preferably a torsional coil spring with one anchoring end or leg interconnected with the fixed guard or drive assembly (at a fixed location thereon) and an opposite end or leg interconnected with the movable guard (also at a fixed location thereon). An off-center spring enclosure, which is radially offset relative to the arbor shaft, is preferably included for restricting radial expansion of the torsional spring to directions away from the workpiece (on opposite sides of the arbor shaft from the workpiece) in order to maximize the workpiece cutting depth capacity of the saw blade or cutter.

Another optional but preferred feature of the invention is an arbor shaft cover that is pivotally interconnected with the fixed guard and that substantially prevents or minimizes any tendency of the arbor shaft nut, screw or other blade-securing fastener to work loose on, or free of, the arbor shaft. Such arbor cover can be pivoted out of the way to allow blade removal or blade changing by way of a releasable cover retaining fastener at one end of the pivotal cover, with such retaining fastener also optionally being configured to extend axially inside the fixed guard when tightened so as to act as one of a pair of blade calipers axially spaced from opposite sides of the blade or cutter. Such calipers thereby prevent or substantially minimize damage to the fixed guard in the event of a bent or deflected blade or cutter.

A hold-down strap member can also be included and be can pivotally interconnected with the saw's base for movement between a storage position and a hold-down position in releasable engagement with the saw's drive assembly in order to releasably secure the drive assembly in a lowered storage position relative to the base.

Also, the operator handle of the saw preferably includes a horizontally extending gripping portion that is generally centered laterally with respect to the plane of the blade or cutter. This contributes advantageously to workpiece visibility, ease of use, and operator control of the saw or other cutting device so equipped.

Other advantages, objects and features of the present invention will become apparent to those skilled in the art from the subsequent detailed description, appended claims and accompanying drawings.

DETAILED DESCRIPTION OF THE PREFERRED EMBODIMENTS

Figure 1:
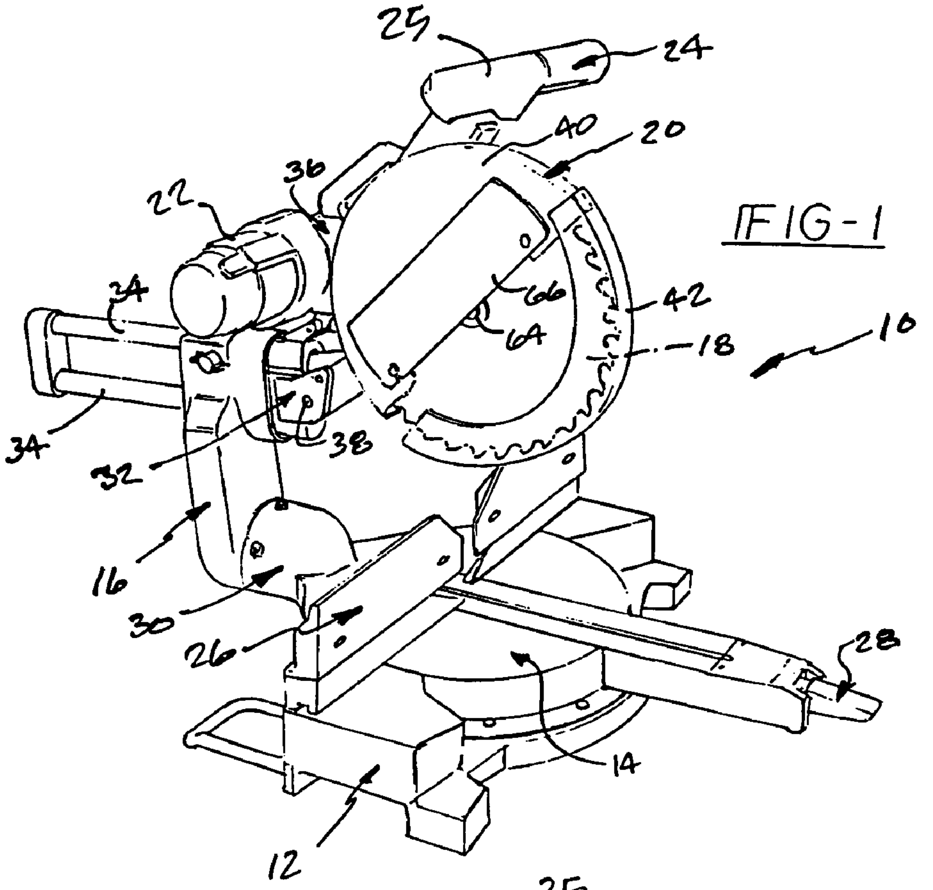
FIG. 1 is a front perspective view of a sliding compound miter saw in accordance with the present invention.
Figure 2:
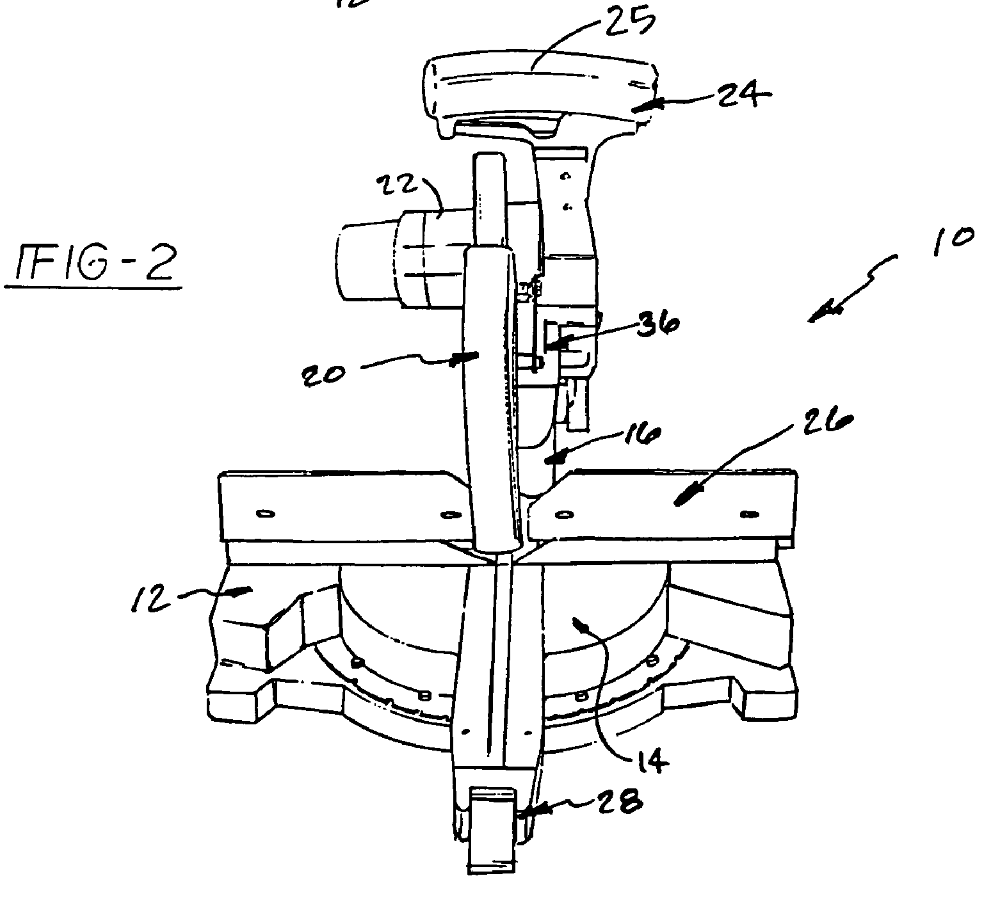
FIG. 2 is a front elevational view of the sliding compound miter saw shown in FIG. 1.
Figure 3:
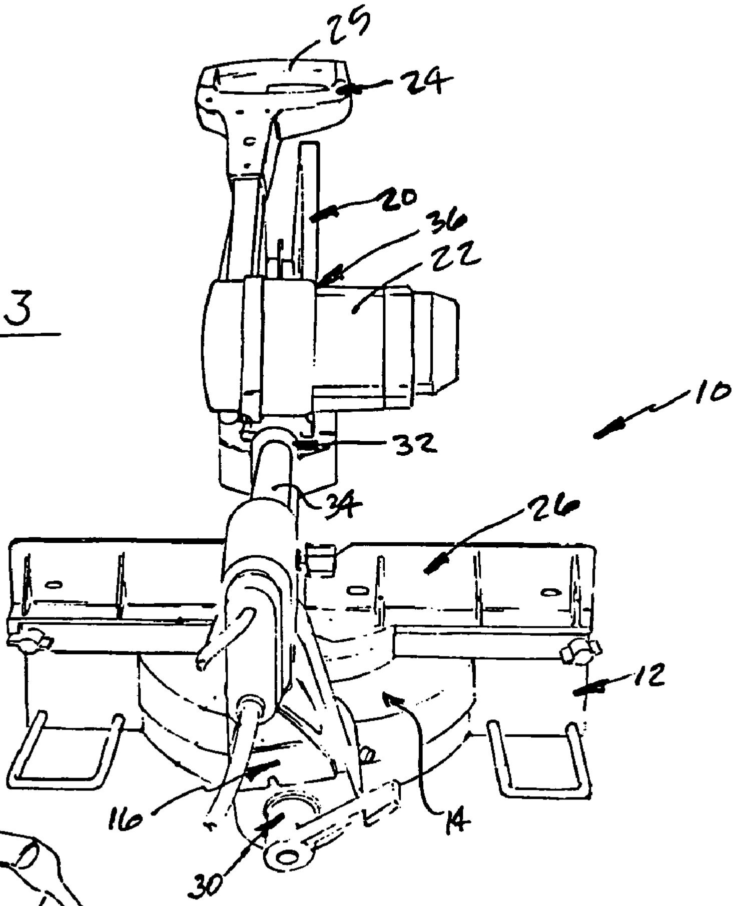
FIG. 3 is a rear elevational view of the sliding compound miter saw shown in FIGS. 1 and 2.
Figure 4:
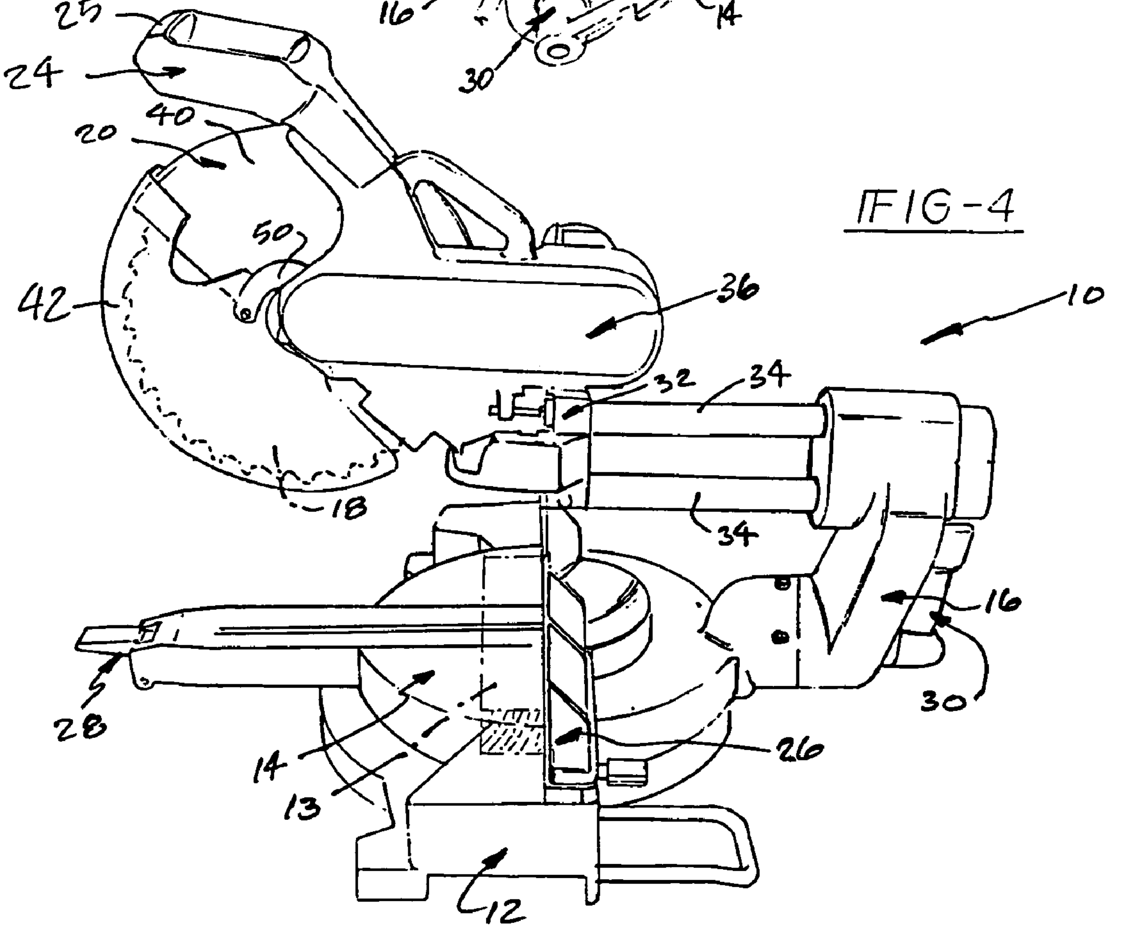
FIG. 4 is a right-hand side elevational view of the sliding compound miter saw shown in FIGS. 1 through 3.
Figure 5:
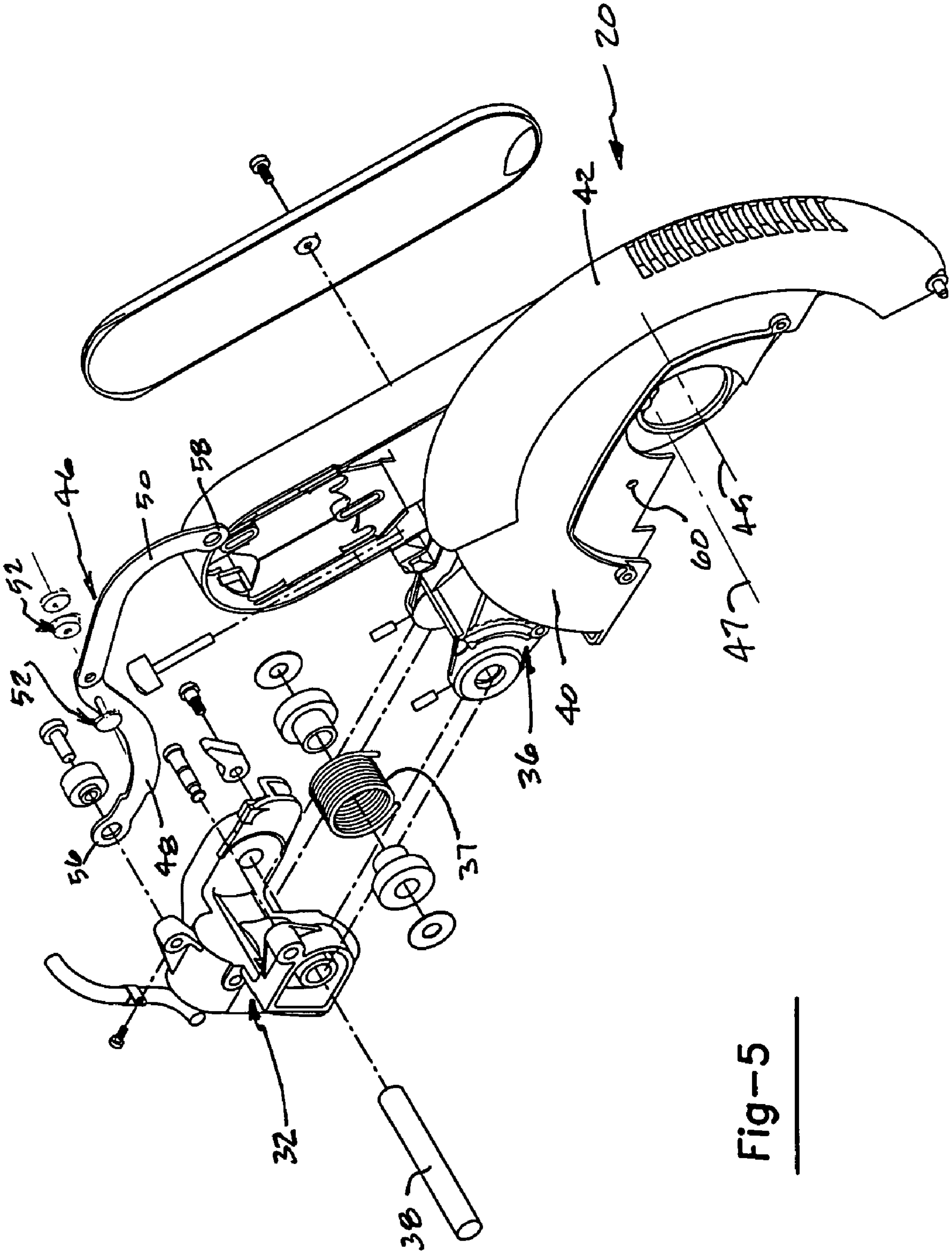
FIG. 5 is a partially exploded perspective view of a preferred blade guard mechanism in accordance with the present invention.
Figure 6:
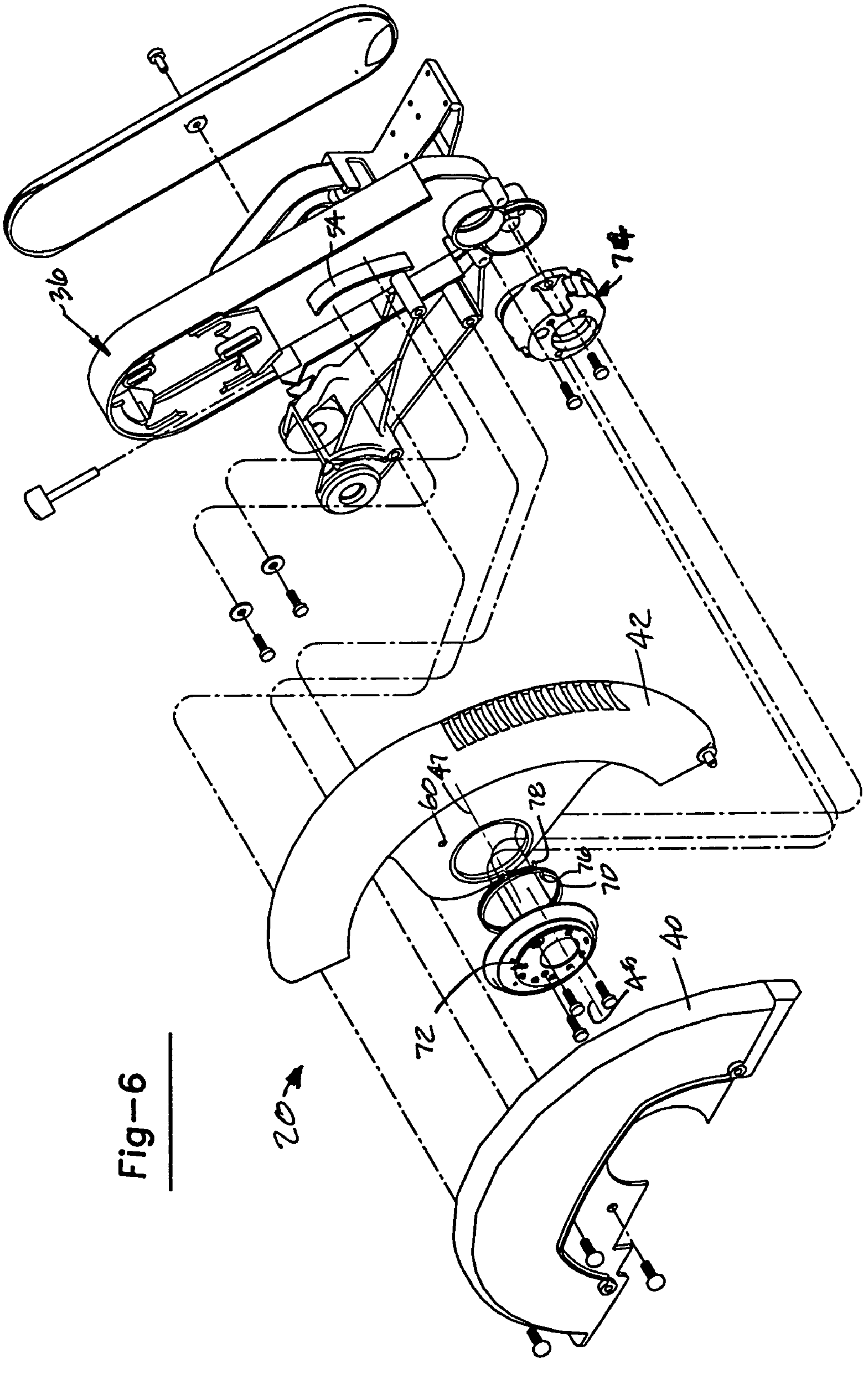
FIG. 6 is another partially exploded perspective view of the blade guard mechanism of FIG. 5, revealing still further details of its preferred construction.
Figure 7:
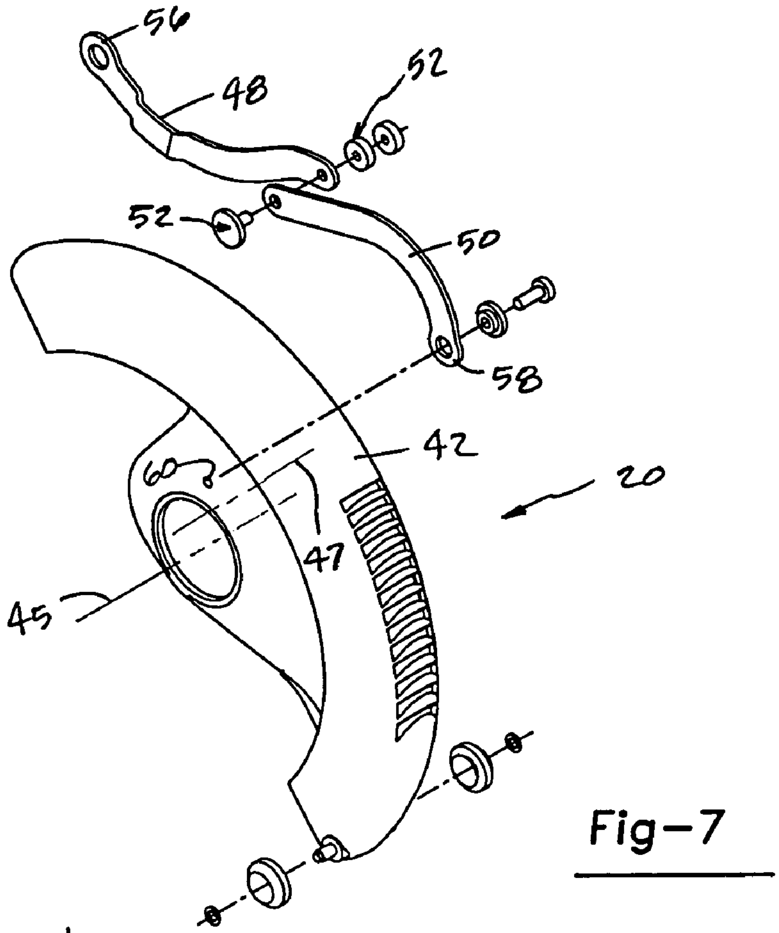
FIG. 7 is a partial exploded detail view of the movable portion of the guard mechanism shown in FIGS. 5 and 6, illustrating in more detail the guard-opening linkage arrangement.

FIGS. 1 through 14*b* depict exemplary embodiments of a sliding compound miter saw according to the present invention, which is shown in the drawings merely for purposes of illustration. One skilled in the art will readily recognize, from the following description, taken in conjunction with the accompanying drawings and claims, that the principles of the invention are equally applicable to compound miter saws and/or chop saws of types other than that depicted in the drawings. Similarly, one skilled in the art will readily recognize that the principles of the invention may also be applicable to other workpiece cutting, forming or shaping devices.

In FIGS. 1 through 4, an exemplary sliding compound miter saw incorporating a cutter or blade guard mechanism, as well as other features according to the present invention, is designated generally by the reference numeral 10. The sliding compound miter saw 10 includes a base assembly 12, an angularly movable turntable or table assembly 14, an angularly movable housing assembly 16, a saw blade 18, a blade guard mechanism or assembly 20, a motor 22 drivingly connected to the saw blade 18 by way of a drive assembly 36, a handle arrangement 24, and a workpiece-supporting fence assembly 26. The table assembly 14 is secured to the base assembly 12 such that it can be rotated in order to provide adjustment for miter cutting of a workpiece 13 (shown in phantom lines in FIG. 4). The rotation of the table assembly 14 changes the angle of saw blade 18 relative to the fence assembly 26 but maintains the perpendicularity of the plane of the saw blade 18 with the table assembly 14. A locking mechanism 28 can be activated in order to lock the table assembly 14 to the base assembly 12 at a desired miter-cutting position.

The housing assembly 16 is secured to the table assembly 14 such that it can be pivoted with respect to the table assembly in order to provide adjustment for bevel cutting of the workpiece 13. The bevel pivoting of the housing assembly 16 changes the angle of the saw blade 18 relative to the table assembly 14 but maintains the perpendicularity of the saw blade 18 with respect to the fence assembly 26. A locking mechanism 30 can be activated in order to lock the housing assembly 16 to table assembly 14 at a desired bevel-cutting position. As can be appreciated by one skilled in the art, the adjustments for mitering and beveling can be performed separately or simultaneously in order to perform a compound miter and bevel cut.

The housing assembly 16 also includes a support housing or assembly 32, which mounts a pair of support arms 34 for sliding movement with respect to the remainder of the housing assembly 16. The saw blade 18, the blade guard 20, the motor 22 and the handle 24 are all mounted to a drive assembly 36, which is pivotally interconnected with the support arms 34 and thus the support assembly 32. The pivoting of the drive assembly 36 downwardly towards the table assembly 14 operates to bring the saw blade 18 into a workpiece-engaging position and simultaneously open the blade guard 20 (as is described in more detail below) in order to cut a workpiece which is supported by the table assembly and the fence assembly 26. The sliding movement of the support arms 34 relative to the housing 16 permits the drive assembly 36 and thus the saw blade 18 to be pulled or pushed through the workpiece.

Referring to FIGS. 1 through 8, the blade guard assembly 20 includes a fixed upper blade guard 40 and a movable lower blade guard 42. The movable guard 42 is interconnected for pivotal movement about an arbor shaft axis 45 of a blade arbor shaft 44 between a "closed" position, wherein the movable guard 42 covers a maximum portion of the cutting periphery of the blade 18, and an "open" position covering a minimum portion of the cutting periphery of the blade 18 in order to allow the blade 18 to perform cutting operations on the workpiece 13 and to allow for blade removal or replacement.

The blade guard assembly 20 also includes a linkage assembly 46, which functions to pivot the movable guard 42 between its open and closed positions as the drive assembly 36 is pivoted by the operator about a pivot pin 38 (FIG. 5) toward and away from the workpiece 13, respectively. This motion of the movable guard 42 with respect to the fixed guard 40 is further described below and is diagrammatically and schematically illustrated in FIGS. 10*a* through 10*d* (in which various parts of the compound miter saw are removed or broken away for clarity).

The linkage assembly 46 includes an inner link 48 having an inner end 56 pivotally interconnected with the support housing 32 at a fixed location thereon. The linkage assembly 46 also includes an outer link 50 having an outer end 58 pivotally interconnected with the movable guard 42, also at a fixed location thereon. The opposite intermediate ends of the inner link 48 and the outer link 50 are pivotally interconnected with each other and with an intermediate rotatable pivot and roller assembly 52. The roller assembly 52 is adapted to engage a cam surface 54 formed on the drive housing assembly 36 (and thus fixed relative to the fixed upper guard) for purposes of controlling the closing and opening movement of the movable guard 42 as the drive housing 36 and the blade 18 are raised and lowered, respectively, out of and into cutting engagement with the workpiece 13. The shape and position of the cam surface 54 are carefully chosen in order to determine and select the amount and rate of opening movement of the lower guard 42. These raised and lowered positions are diagrammatically illustrated in FIGS. 10*a* and 10*c*, respectively.

Figure 10A:
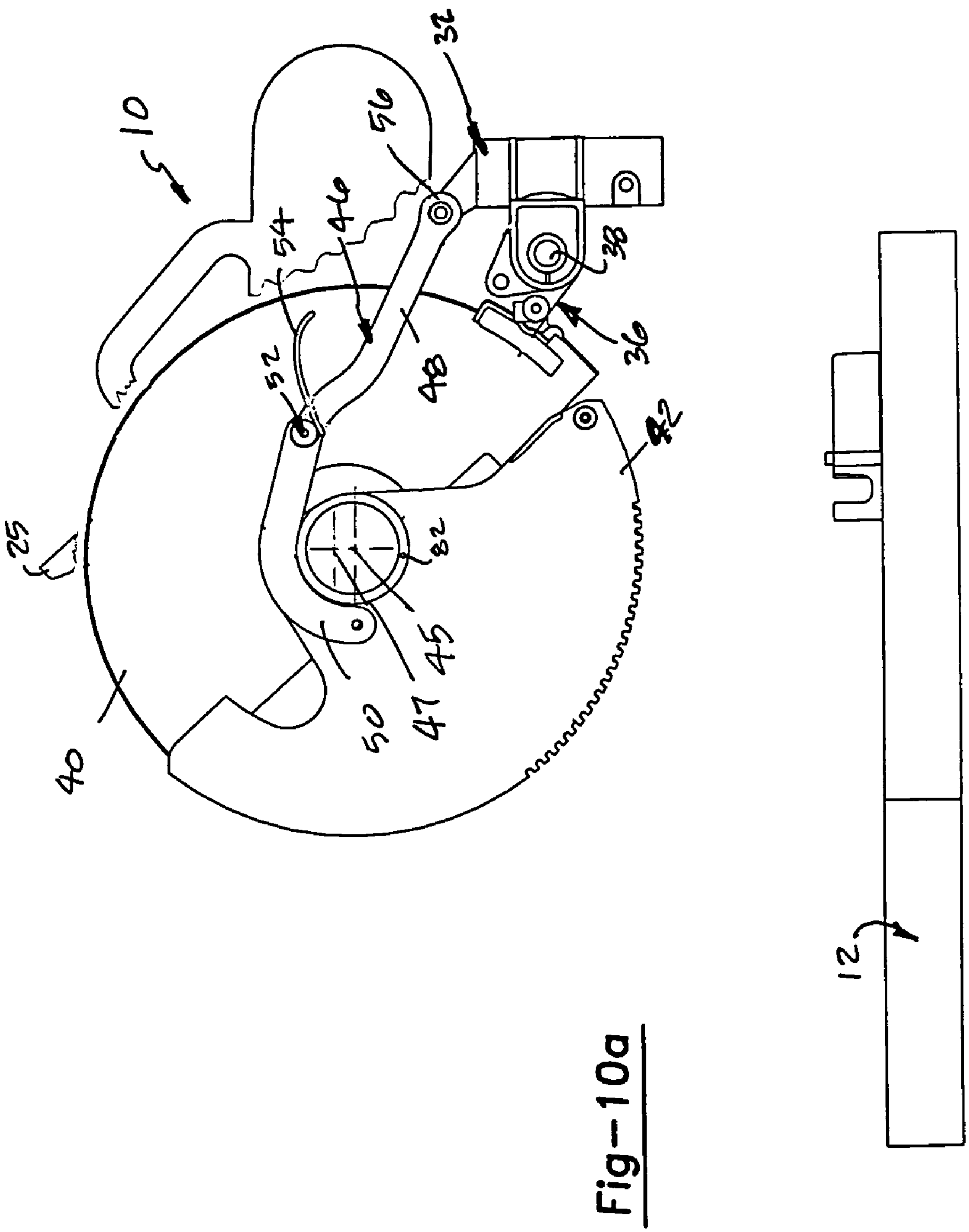
FIGS. 10*a* through 10*d* are diagrammatic views, with parts removed or broken away, to schematically illustrate the operation of the linkage arrangement for controlling the lower guard movement between workpiece non-engagement and engagement positions for the blade or cutter of the saw illustrated in FIGS. 1 through 9.
Figure 10B:
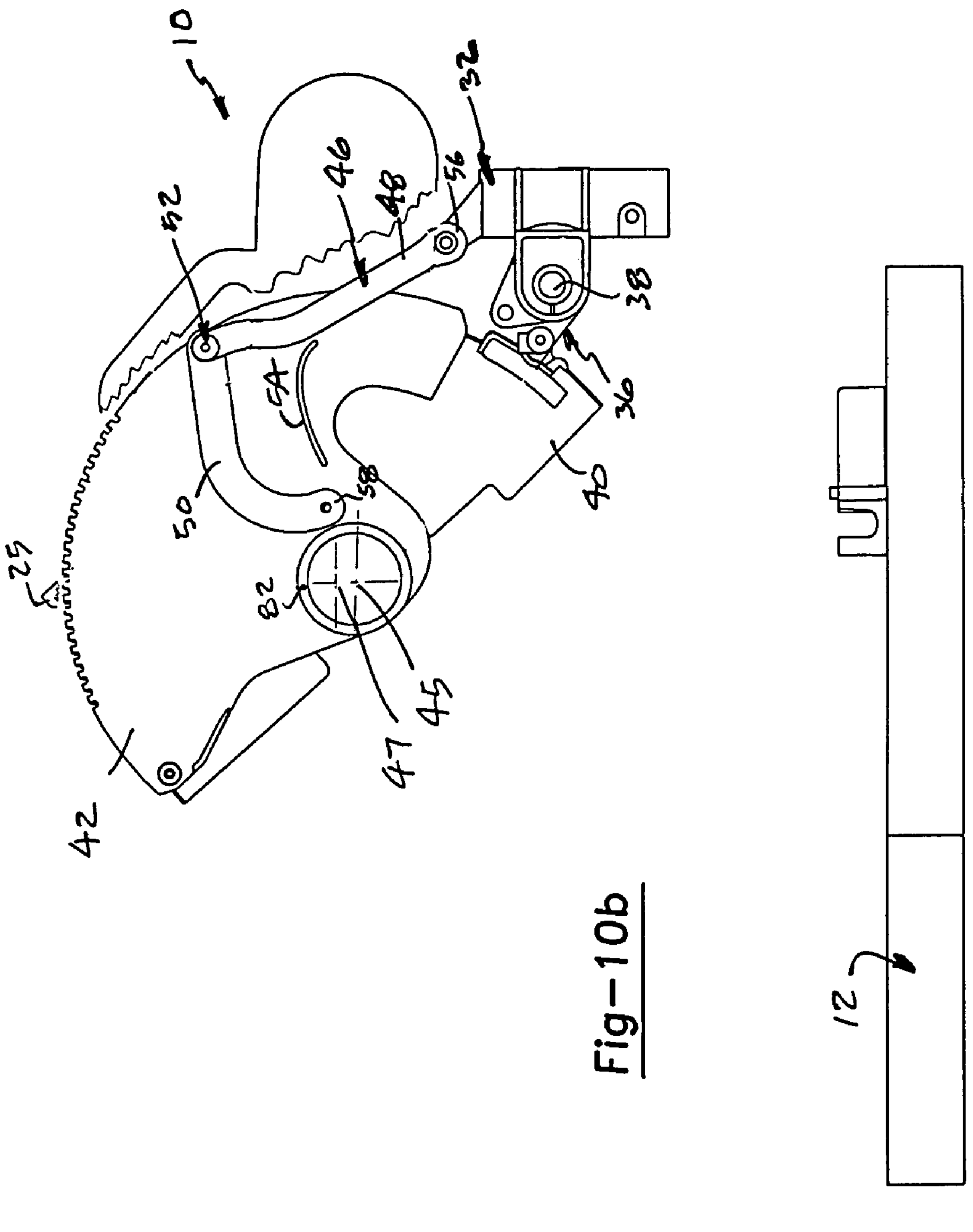
Figure 10C:
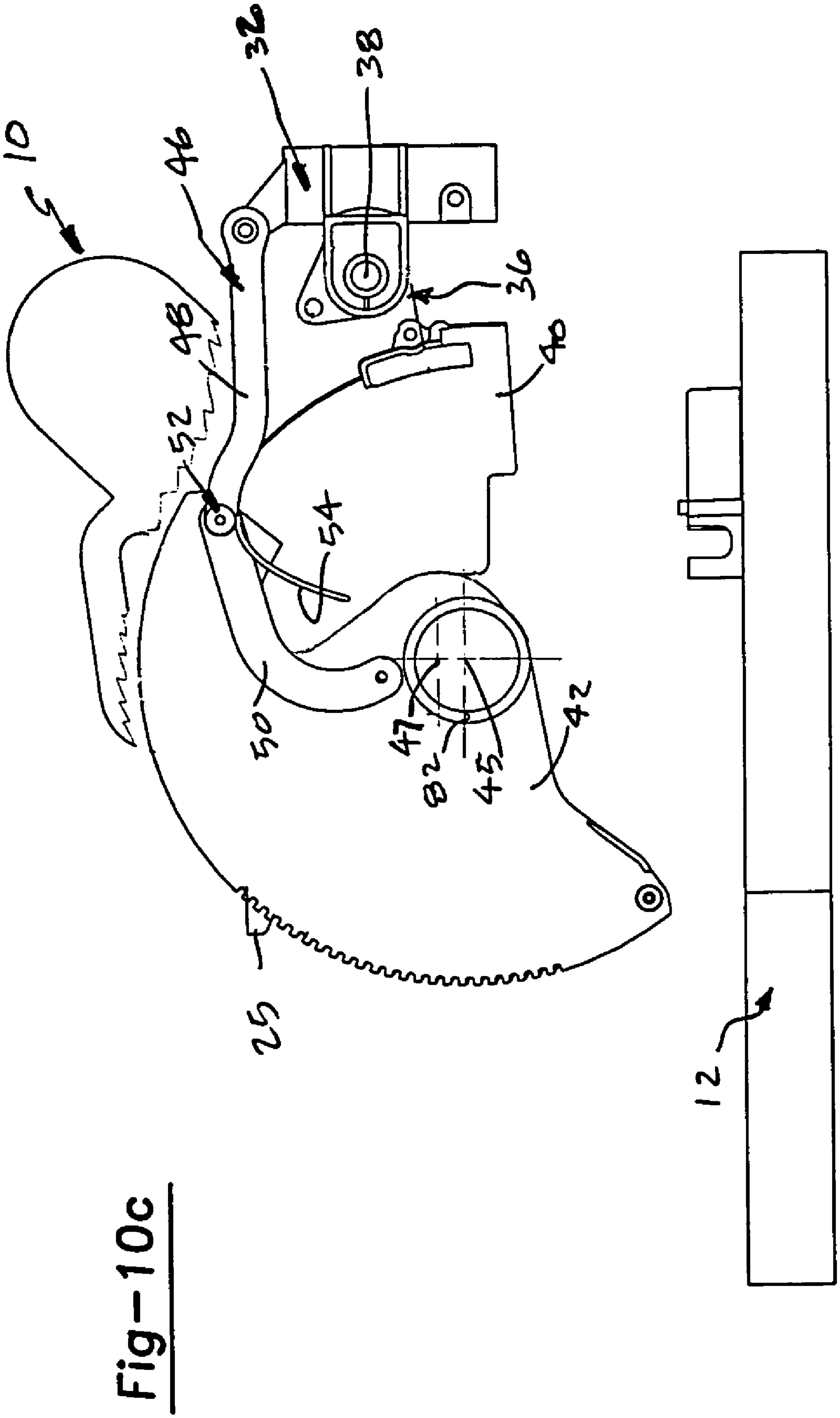
Figure 10D:
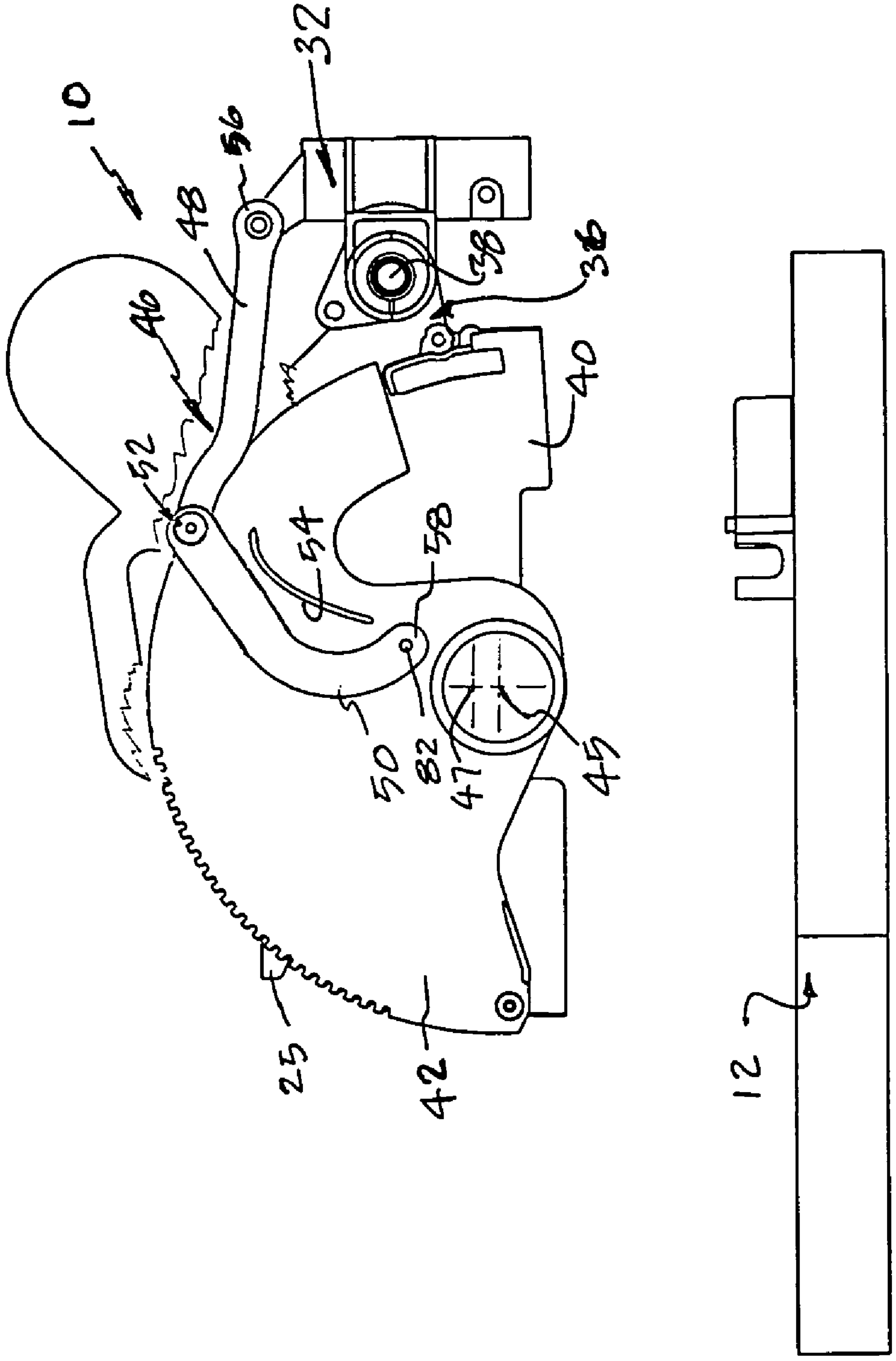

Because the intermediate roller assembly 52 is free to move, along with the intermediate ends of the inner link 48 and the outer link 50, along the cam surface 54, the location of the intermediate roller assembly 52 is not fixed or restrained with respect to either the fixed upper guard 40 (which is fixed with respect to the drive assembly 36) or the movable lower guard 42. Thus, primarily for ease of blade changing, replacement or maintenance, the movable lower guard 42 can be manually pivoted by the user about the arbor shaft axis 45 in an overriding manner, independent and irrespective of the pivotal position of the drive assembly 36 and the blade 18. Two examples of this independent overriding movement of the movable lower guard 42 are shown in FIG. 10*b*, wherein the movable guard 42 has been pivoted to a maximum open position with the drive assembly 36 in its upward, "at rest" position, and in FIG. 10*d*, wherein the movable guard 42 has been independently and overridingly pivoted about the arbor shaft axis 45 to a maximum open position with the blade 18 and the drive assembly 36 in their downward, workpiece-engaging position. In both of these overridingly and independently pivoted positions of the movable lower guard 42, the intermediate roller assembly 52, along with the intermediate ends of the inner and outer links 48 and 50, pivot upwardly out of contact with the cam surface 54.

Referring primarily to FIGS. 5 through 9*c*, the linkage assembly 46 also preferably includes a return spring 70, which is preferably of the torsional coil spring variety shown in the drawings. The return spring 70 functions to resiliently and normally bias the movable lower guard 42 toward its "closed" position illustrated in FIGS. 1 through 4 and 10*a*. This return spring 70, along with the drive assembly return spring 37 shown in FIG. 5, thus serve to resiliently bias both the movable lower guard 42 and the entire drive assembly 36 to the "at-rest" position shown in FIGS. 1 through 4 and 10*a*.

Because the preferred return spring 70 is a torsional coil spring, it radially expands and contracts relative to the arbor shaft axis 45 as the movable guard 42 is pivoted about a lower guard axis 47 (see FIGS. 8, 9*a–c*, and 10*a–d*) between its "closed" and "open" positions, respectively. The drive assembly 36 is also preferably equipped with a return spring enclosure 72, shown in FIGS. 6 and 8 and diagrammatically illustrated in FIGS. 9*a* through 9*c*. The return spring enclosure 72 is radially offset with respect to the pivot axis 47 of the movable lower guard 42 in a generally upward direction, away from the saw's base assembly 12 and the workpiece 13. The offset return spring enclosure 72 is mounted on, or interconnected with, a drive assembly hub portion 74 (shown in FIG. 6) of the drive assembly 36 and is thus fixed with respect to the fixed upper guard 40. The return spring 70 includes a fixed spring leg 76 (fixed relative to the spring enclosure 72 by way of its engagement with an opening 80 in the spring enclosure) and a movable spring leg 78 (movable with the movable lower guard 42 by way of its engagement with an opening 82 in the movable lower guard) at its ends. The return spring legs 76 and 78 are carefully placed and configured to prevent extreme bending of these legs as the spring expands and contracts.

Figure 9A:
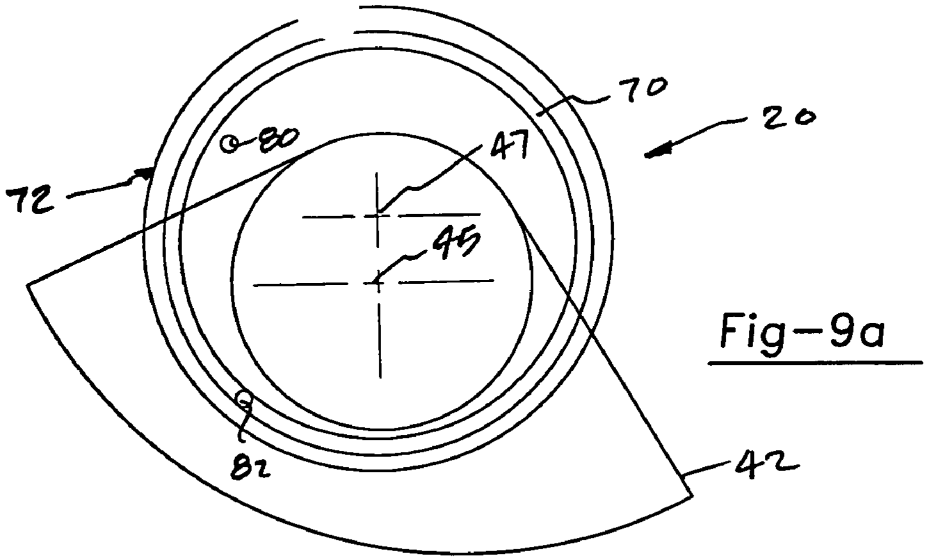
FIGS. 9*a* through 9*c* schematically illustrate the resilient flexing of the preferred torsional lower guard return spring at various movable lower guard positions for the preferred guard mechanism of FIGS. 5 through 8.
Figure 9B:
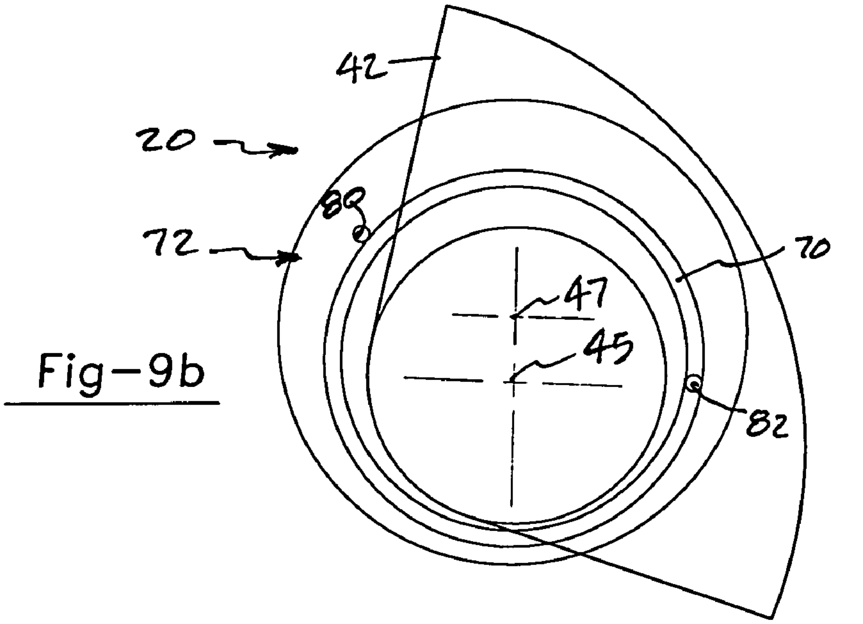
Figure 9C:
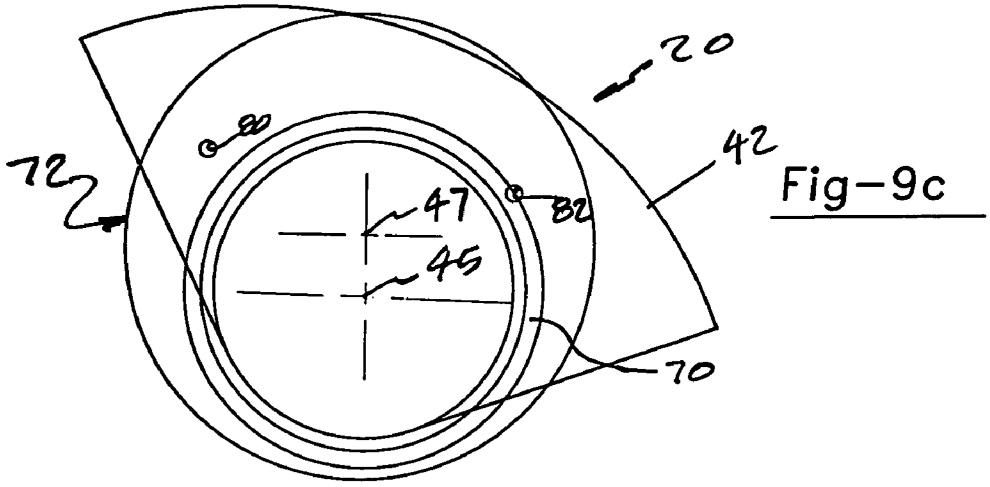

As is diagrammatically illustrated in FIGS. 9*a* through 9*c*, the radially offset configuration of the return spring enclosure 72 allows the return spring 70 to radially expand and contract to a greater degree in directions away from the saw's base assembly 12, and thus away from the workpiece 13, than in directions toward the workpiece 13. This feature minimizes interference with the workpiece 13 during cutting operations and thus maximizes the cutting depth capacity of the compound miter saw 10. Preferably, the spring enclosure 72 and the return spring 70 are placed inside the blade cavity rather than outside, to allow for more gearbox space. This further provides more space for the return spring 70 itself, which significantly extends spring life.

FIG. 9*a* diagrammatically depicts the movable lower guard 42 in its "closed" position, with the return spring 70 in its preloaded, maximum radially-expanded condition. FIG. 9*b* illustrates the position of the movable lower guard 42 and the degree of radial expansion of the return spring 70 when the drive assembly 36 is lowered to a workpiece-engaging or cutting position. FIG. 9*c* illustrates the position of the movable lower guard 42 and the minimal radially expansion condition of the return spring 70 when the movable lower guard 42 is manually and overridingly opened to its maximum extent.

Figure 11:
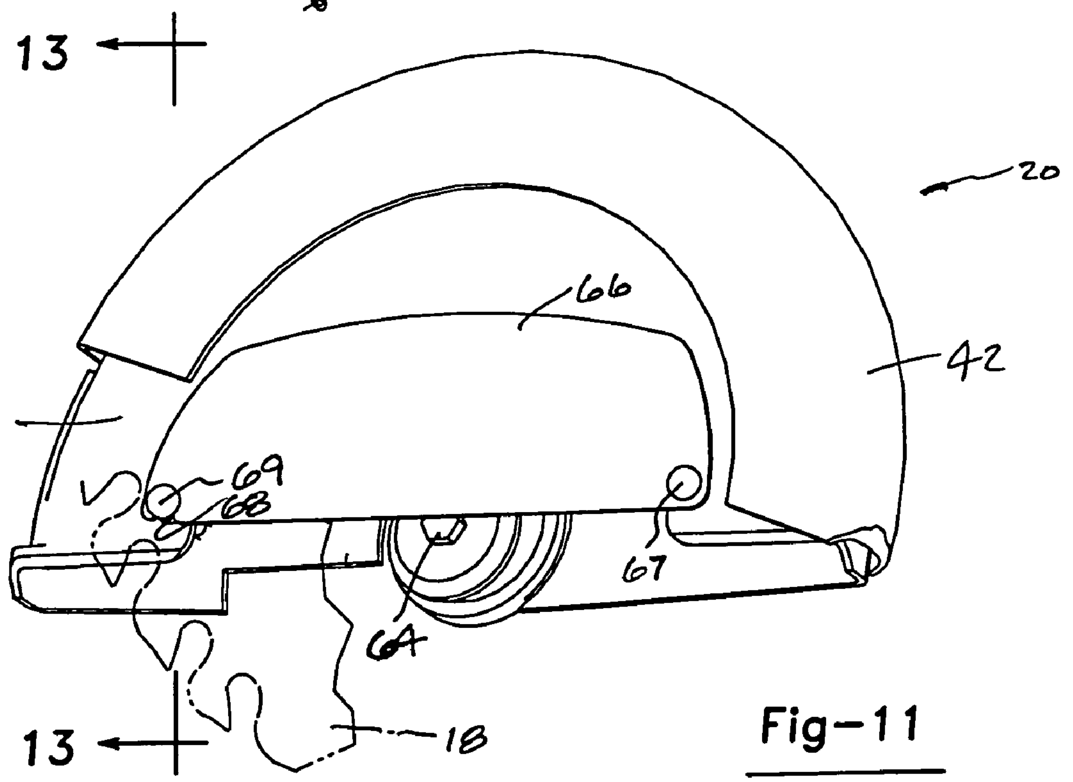
FIG. 11 is a partial left-hand side view of the preferred guard mechanism, illustrating the blade arbor shaft cover in an operating position.
Figure 8:
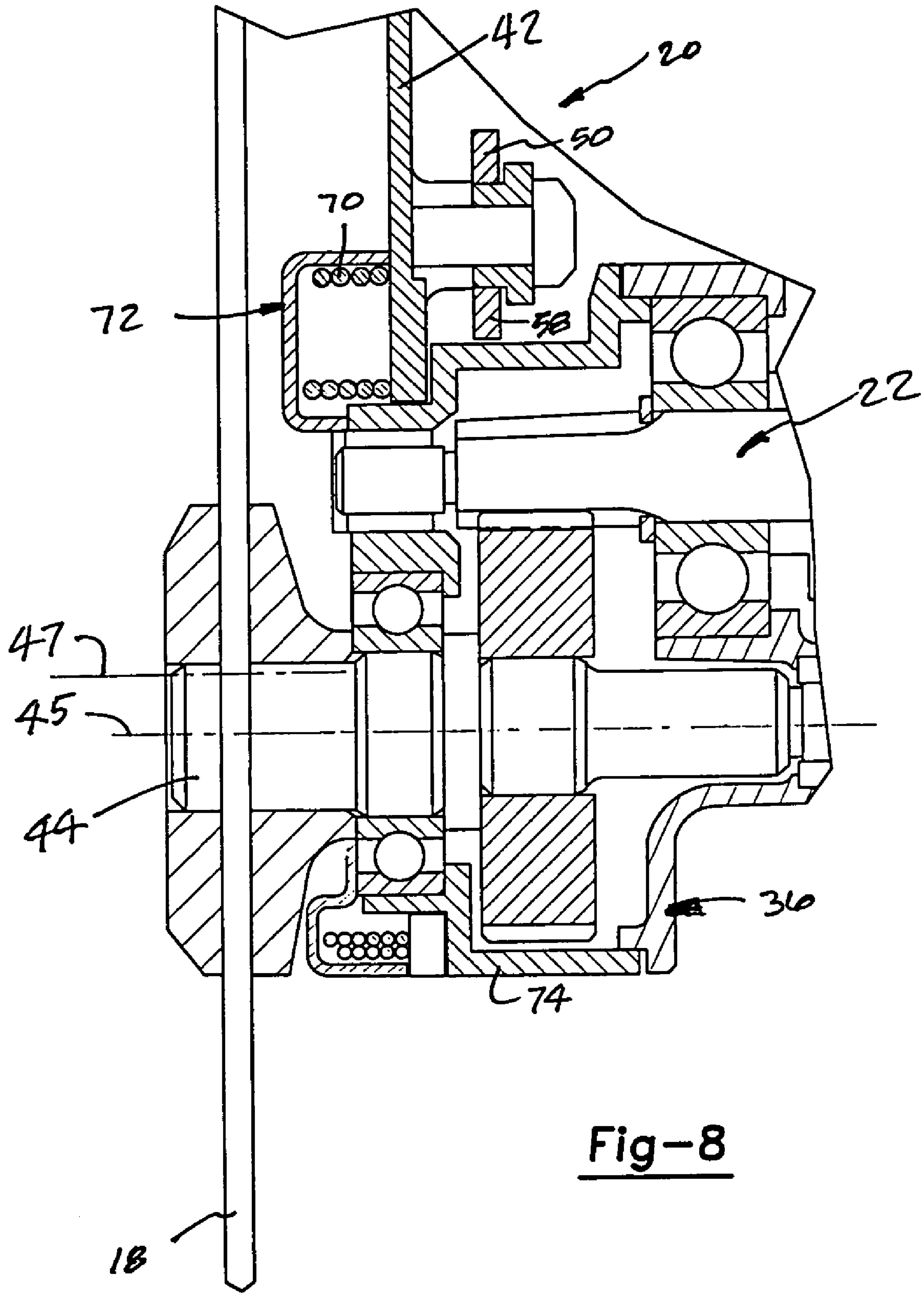
FIG. 8 is a partial cross-sectional detail view of the lower guard return spring and spring enclosure arrangement of the guard mechanism of FIGS. 5 through 7.
Figure 12:
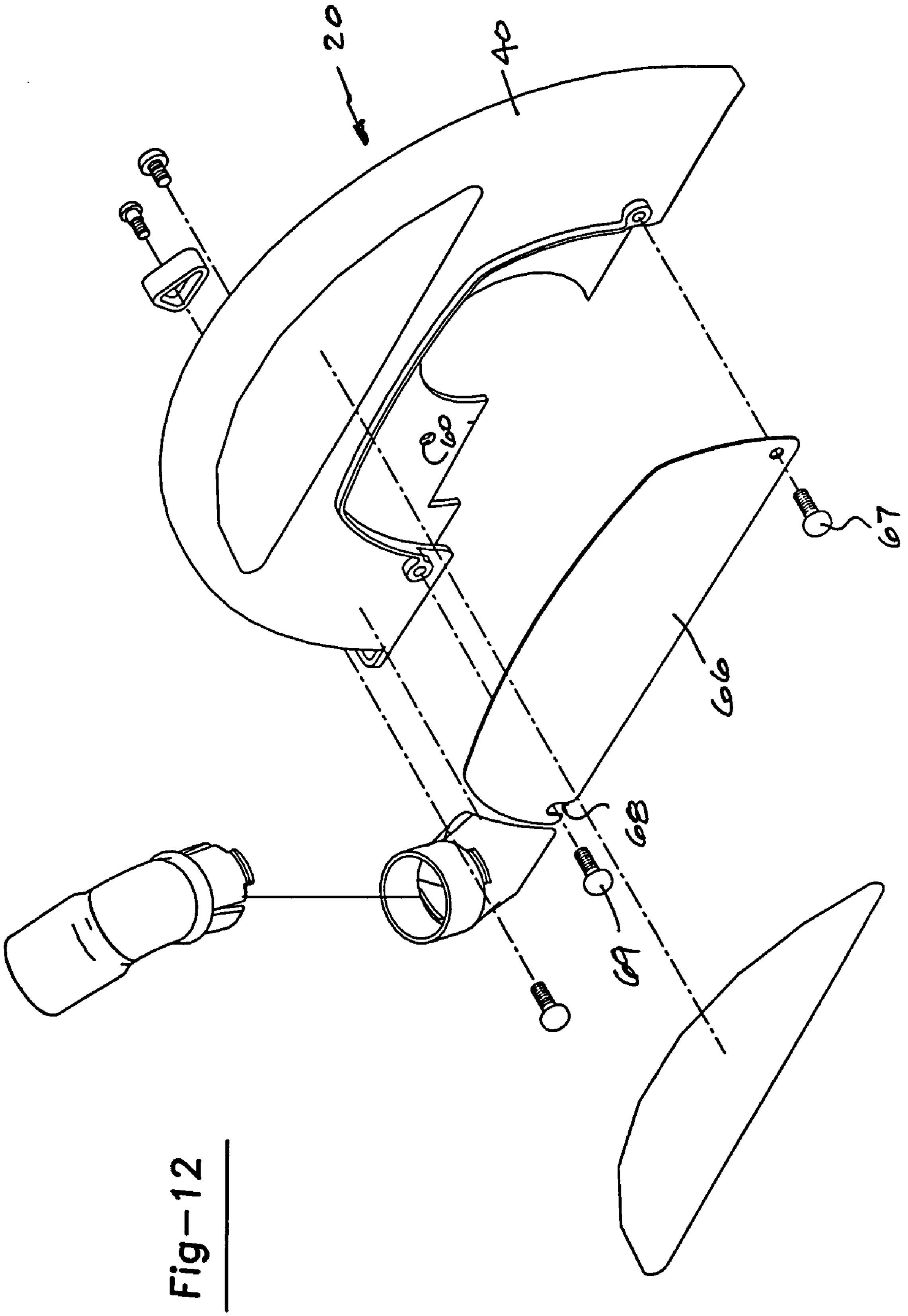
FIG. 12 is a partial exploded view, further illustrating the arbor shaft cover arrangement of FIG. 11.

Referring to FIGS. 11 through 13, the drive assembly 36 of the compound miter saw 10 also preferably includes an arbor shaft cover 66 pivotally interconnected at one end by way of a pivot fastener 67 to the fixed upper guard 40. The opposite end of the arbor shaft cover 66 is releasably secured to the fixed upper guard 40 by way of a threaded retaining fastener 69 that passes through a slotted opening 68 in the arbor shaft cover 66. This allows the cover 66 to be selectively released and pivoted upwardly about the pivot fastener 67 relative to the fixed upper guard 40 to an "open" position, thus completely exposing the arbor shaft fastener 64 and allowing removal, replacement or maintenance of the blade 18. When the arbor shaft cover 66 is pivoted back to its "closed" position shown in FIG. 11, it preferably covers at least one-half of the diameter of the arbor shaft 44 and prevents the arbor shaft fastener 64 from vibrating loose and falling free of the arbor shaft 44.

Figure 13A:
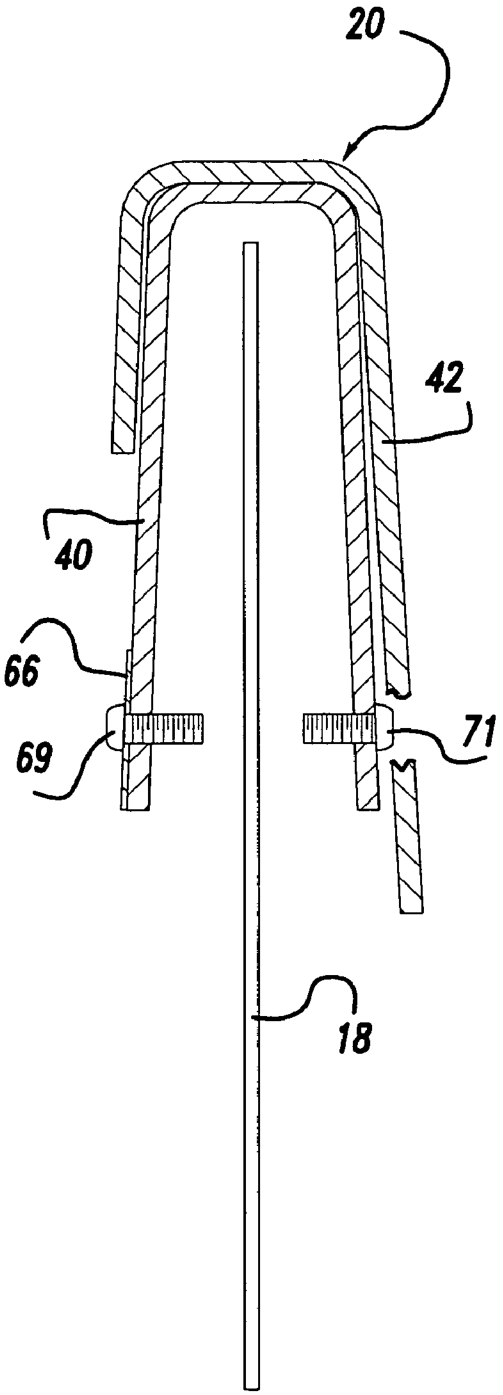
FIGS. 13*a* and 13*b* are partial cross-sectional views, illustrating a blade caliper arrangement incorporated into the arbor shaft cover arrangement.
Figure 13B:
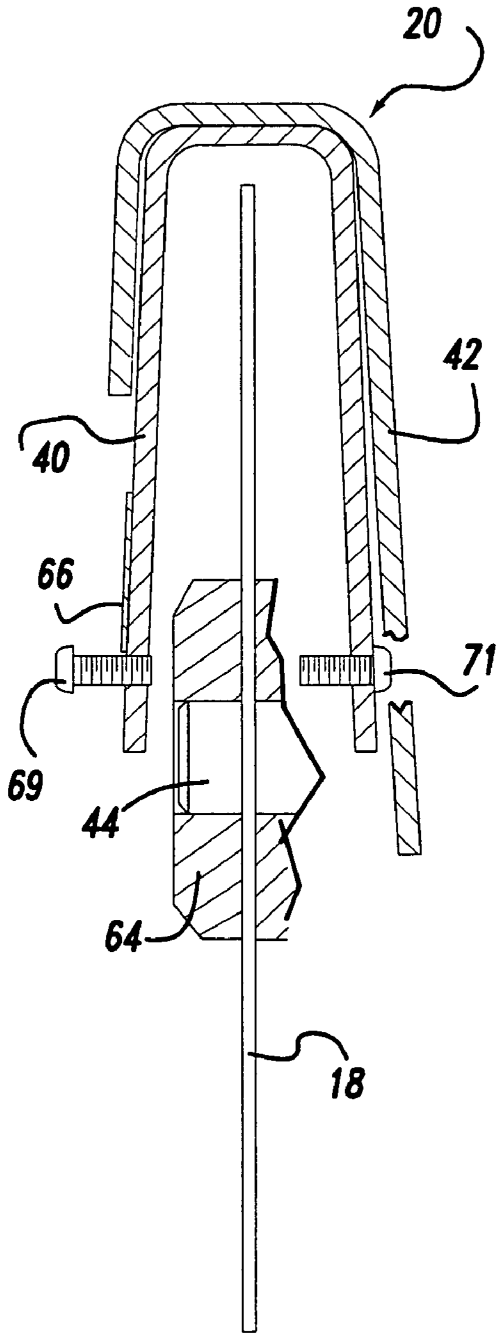

Referring to FIGS. 13*a* and 13*b*; the arbor cover retaining fastener 69 can also optionally be configured to extend axially inside the fixed upper guard 40 to a position axially spaced from the blade 18 at a radial location well inboard of the cutting teeth of the blade 18 when the retaining fastener 69 is threadably tightened on the fixed guard 40, as is diagrammatically shown in FIG. 13*a*. This configuration allows the retaining fastener 69 to act as a blade caliper, in conjunction with another blade caliper 71, while still allowing the fastener 69 to perform its arbor cover retaining function. The blade caliper 71 is fixed on the upper guard 40 and axially spaced from the opposite side of the blade 18, generally at the same inboard radial position as the retaining fastener/caliper 69. These calipers serve to substantially prevent, or at least minimize, damage to the fixed upper guard 40 in the event of a bent or deflected blade 18. As shown in FIG. 13*b*, the retaining fastener 69 can be loosened to release the arbor shaft cover 66 for pivoting to its open position.

Figure 14A:
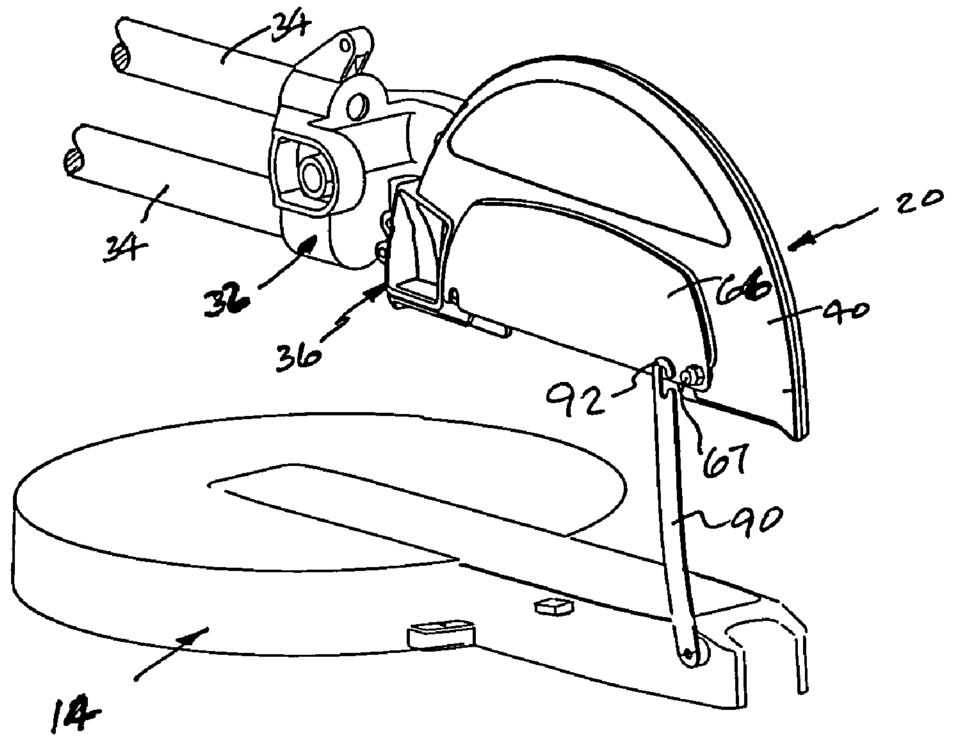
FIGS. 14*a* and 14*b* are partial perspective views of a hold-down arrangement for the preferred sliding compound miter saw depicted in FIGS. 1 through 13.
Figure 14B:
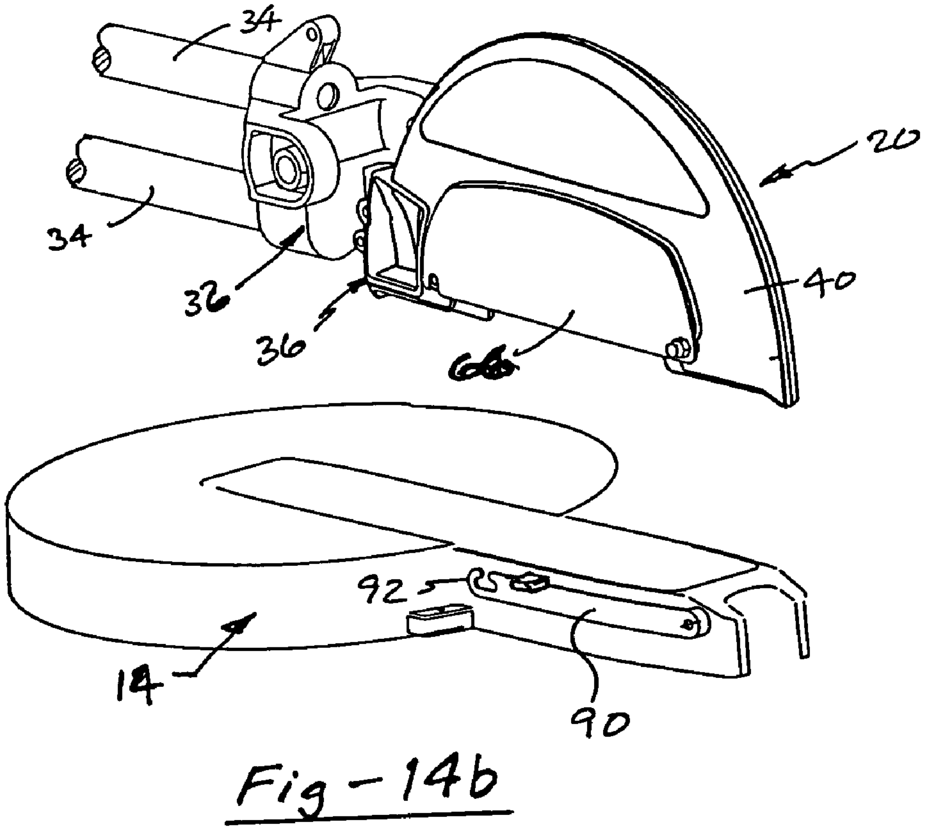

Finally, the saw 10 can optionally be equipped with a hold-down member or strap 90, illustrated in FIGS. 14*a* and 14*b*. The hold-down strap 90 is pivotally interconnected with the base assembly 12, preferably on the turntable assembly 14. The hold-down strap 90 can be pivoted upwardly, as shown in FIG. 14*a*, so that its hooked end 92 can be releasably engaged with the drive assembly 36, preferably at the pivot fastener 67 for the arbor cover 66, thus holding the drive assembly 36 in its downwardly pivoted position and preventing the drive assembly 36 (and thus the support arms 34 and the blade 18) from being slid completely inwardly toward the fence assembly 26 (FIGS. 1 through 4). When not required for saw storage, the hold-down strap 90 can be pivoted to its own storage position shown in FIG. 14*b*, where it is out of the way during workpiece cutting or shaping operations.

The strap 90 can be releasably retained in its storage position using any of a wide variety of well-known releasable retention arrangements. However, one arrangement currently contemplated is a strap 90 that is resiliently deflectable laterally, with the strap having a resilient bias in the rightward lateral direction as viewed in FIGS. 14*a* and 14*b* from the user's normal position. Thus, when it is desired to move the strap 90 from its use position shown in FIG. 14*a* to its storage position shown in FIG. 14*b*, the user merely deflects the resilient strap 90 leftwardly (against its rightward bias) so that the strap 90 can be pivoted downwardly, clear of a retention tab 94 on the turntable assembly 14. Once the strap 90 is pivoted downwardly past the retention tab 94, it can then be released by the user to resiliently deflect rightwardly to be releasably retained beneath the retention tab 94, as shown in FIG. 14*b*. As mentioned above, other common releasable retention schemes can also alternatively be employed.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A cutting device for performing cutting operations on a workpiece, said cutting device comprising:
- a base adapted to receive said workpiece;
- a support attached to said base;
- a drive assembly pivotable attached to said support, said drive assembly including a motor having an arbor shaft rotatably about an arbor axis;
- a cutting tool attached to said arbor shaft;
- a fastener engaging said arbor shaft to attach said cutting tool to said arbor shaft;
- a fixed guard fixedly attached to said drive assembly and pivotably with said drive assembly, said fixed guard covering a first portion of said cutting tool;
- a movable guard pivotably attached to said drive assembly for pivotal movement about said arbor axis, said movable guard movable between a closed position covering a second portion of said cutting tool and an open position exposing said second portion of said cutting tool;
- a separate arbor cover pivotably secured to said fixed guard, said arbor cover being pivotal between a first position covering said fastener and said arbor shaft and a second position completely uncovering said fastener and said arbor shaft, said arbor cover being adapted to prevent said fastener from falling free of said arbor shaft when said arbor cover is in said first position; and
- a retainer extending through said arbor cover and through one side of said fixed guard to secure said arbor cover to said fixed guard, said retainer movable to a first position where an inner end of said retainer is generally flush with an inner surface of said one side of said fixed guard to allow pivotable movement of said arbor cover and a second position where said inner end of said retainer is spaced from said inner surface of said one side of said fixed guard to prohibit pivotable movement of said arbor cover, said inner end of said retainer defining a first blade caliper which protects said fixed guard from said cutting tool.

2. The cutting device according to claim 1, wherein said movable guard is movable between a closed position covering said second portion of said cutting tool and an open position uncovering a majority of said second portion of said cutting tool, said arbor cover being entirely uncovered when said movable guard is in said closed and open positions.

3. The cutting device according to claim 2, wherein said entire movable guard covers said fixed guard when said movable guard is in said open position.

4. The cutting device according to claim 1 further comprising a second blade caliper spaced from an inner surface of the other side of said fixed guard to protect said fixed guard from said cutting tool.

5. The cutting device according to claim 4 further comprising the second blade caliper being disposed opposite to the first blade caliper.

6. A cutting device for performing cutting operations on a workpiece, said cutting device comprising:

a base adapted to receive said workpiece;

a support attached to said base;

a drive assembly pivotable attached to said support, said drive assembly including a motor having an arbor shaft rotatably about an arbor axis;

a cutting tool attached to said arbor shaft;

a fastener engaging said arbor shaft to attach said cutting tool to said arbor shaft;

a fixed guard fixedly attached to said drive assembly and pivotably with said drive assembly, said fixed guard covering a first portion of said cutting tool;

a movable guard pivotably attached to said drive assembly for pivotal movement about said arbor axis, said movable guard movable between a closed position covering a second portion of said cutting tool and an open position exposing said second portion of said cutting tool;

a separate arbor cover pivotably secured to said fixed guard, said arbor cover being pivotal between a first position covering said fastener and said arbor shaft and a second position completely uncovering said fastener and said arbor shaft, said arbor cover being adapted to prevent said fastener from falling free of said arbor shaft when said arbor cover is in said first position;

a torsional coil spring biasing said movable guard into said closed position; and a retainer extending through said arbor cover and through one side of said fixed guard to secure said arbor cover to said fixed guard, said retainer movable to a first position where an inner end of said retainer is generally flush with an inner surface of said one side of said fixed guard to allow pivotable movement of said arbor cover and a second position where said inner end of said retainer is spaced from said inner surface of said one side of said fixed guard to prohibit pivotable movement of said arbor cover, said inner end of said retainer defining a first blade caliper which protects said fixed guard from said cutting tool.

7. The cutting device according to claim 6, wherein said movable guard is movable between a closed position covering said second portion of said cutting tool and an open position uncovering a majority of said second portion of said cutting tool, said arbor cover being entirely uncovered when said movable guard is in said closed and open positions.

8. The cutting device according to claim 7, wherein said entire movable guard covers said fixed guard when said movable guard is in said open position.

9. The cutting device according to claim 6 further comprising a second blade caliper spaced from an inner surface of the other side of said fixed guard to protect said fixed guard from said cutting tool.

10. The cutting device according to claim 9 further comprising the second blade caliper being disposed opposite to the first blade caliper.

11. A cutting device for performing cutting operations on a workpiece, said cutting device comprising:

a base adapted to receive said workpiece;

a support arm attached to said base;

a drive support slidingly engaging said support arm;

a drive assembly pivotably attached to said drive support, said drive assembly including a motor having an arbor shaft rotatably about an arbor axis;

a cutting tool attached to said arbor shaft;

a fastener engaging said arbor shaft to attach said cutting tool to said arbor shaft;

a fixed guard fixedly attached to said drive assembly and pivotably with said drive assembly, said fixed guard covering a first portion of said cutting tool;

a movable guard pivotably attached to said drive assembly for pivotal movement about said arbor axis, said movable guard movable between a closed position covering a second portion of said cutting tool and an open position exposing said second portion of said cutting tool;

a separate arbor cover pivotably secured to said fixed guard, said arbor cover being pivotal between a first position covering said fastener and said arbor shaft and a second position completely uncovering said fastener and said arbor shaft, said arbor cover when said arbor cover is in said first position; and a retainer extending through said arbor cover and through one side of said fixed guard to secure said arbor cover to said fixed guard, said retainer movable to a first position where an inner end of said retainer is generally flush with an inner surface of said one side of said fixed guard to allow pivotable movement of said arbor cover and a second position where said inner end of said retainer is spaced from said inner surface of said one side of said fixed guard to prohibit pivotable movement of said arbor cover, said inner end of said retainer defining a first blade caliper which protects said fixed guard from said cutting tool.

12. The cutting device according to claim 11, wherein said movable guard is movable between a closed position covering said second portion of said cutting tool and an open position uncovering a majority of said second portion of said cutting tool, said arbor cover being entirely uncovered when said movable guard is in said closed and open positions.

13. The cutting device according to claim 12, wherein said entire movable guard covers said fixed guard when said movable guard is in said open position.

14. The cutting device according to claim 11 further comprising a second blade caliper spaced from an inner surface of the other side of said fixed guard to protect said fixed guard from said cutting tool.

15. The cutting device according to claim 14 further comprising the second blade caliper being disposed opposite to the first blade caliper.

* * * * *

UNITED STATES PATENT AND TRADEMARK OFFICE

CERTIFICATE OF CORRECTION

PATENT NO. : 6,971,297 B1
APPLICATION NO. : 09/698920
DATED : December 6, 2005
INVENTOR(S) : Daryl S. Meredith et al.

It is certified that error appears in the above-identified patent and that said Letters Patent is hereby corrected as shown below:

Column 8,
Line 17, "pivotable" should be -- pivotably --.

Column 9,
Line 5, "pivotable" should be -- pivotably --.

Column 10,
Line 25, after "cover" insert -- being adapted to prevent said fastener from falling free of said arbor shaft --.

Signed and Sealed this

Eleventh Day of July, 2006

JON W. DUDAS
*Director of the United States Patent and Trademark Office*